United States Patent Office 3,230,181
Patented Jan. 18, 1966

3,230,181
DEHYDROHALOGENATION CATALYST
George R. Lester, Mount Prospect, Ill., assignor to Universal Oil Products Company, Des Plaines, Ill., a corporation of Delaware
No Drawing. Filed Oct. 15, 1962, Ser. No. 230,714
7 Claims. (Cl. 252—441)

This invention relates to a novel catalyst for the dehydrohalogenation of alkyl halides and to a novel method of preparing said catalyst.

Dehydrohalogenation, wherein a hydrogen halide is evolved from an alkyl halide to yield a corresponding olefin, is generally carried out by processing the alkyl halide over a fixed catalyst bed at dehydrohalogenation reaction conditions. Calcium chloride is generally considered to be one of the better dehydrohalogenation catalysts, being both an active catalyst in this respect and possessed of a stable granular configuration adaptable to a fixed-bed type of operation. It has been observed that calcium bromide exhibits greater activity than does calcium chloride with respect to those halides more difficult of dehydrohalogenation, particularly alkyl bromides. However, calcium bromide lacks the stability of calcium chloride, being much more hygroscopic and extremely difficult to prepare and maintain in granular form, or other shaped particules such as pills, pellets, and the like, essential to a fixed-bed type of operation.

It is an object of this invention to present a stable calcium bromide dehydrohalogenation catalyst. It is a further object of this invention to present a novel method for the preparation of said catalyst.

In one of its broad aspects this invention embodies a method of preparing a dehydrohalogenation catalyst which comprises heating a compound of calcium selected from the group consisting of calcium chloride and calcium oxide in contact with hydrogen bromide and forming a catalyst composite comprising said compound of calcium and from about 5% to about 95% calcium bromide.

Another embodiment of this invention relates to a dehydrohalogenation catalyst composite comprising a compound of calcium selected from the group consisting of calcium chloride and calcium oxide, and from about 5% to about 95% calcium bromide.

Other objects and embodiments of this invention will become apparent in the following detailed description thereof.

In accordance with the method of preparation herein disclosed, calcium chloride, or calcium oxide as the case may be, is heated in contact with hydrogen bromide. A flow of hydrogen bromide may be continuously processed through a fixed-bed of the calcium compound at a predetermined temperature and for a time sufficient to form the desired composite which may contain up to about 95% calcium bromide, or the hydrogen bromide and the calcium chloride may be charged to a closed vessel in fixed amounts and heated therein. In either case, a substantially anhydrous hydrogen bromide is preferred. It is further preferred to utilize the hydrogen bromide in a diluted state, for example, diluted with nitrogen or other inert diluent.

The temperature at which the calcium chloride or the calcium oxide is heated in contact with hydrogen bromide may vary over a wide range. In general, a temperature of from about 50° C. to about 550° C. is suitable although a temperature in the upper range of from about 300° C. to about 550° C. has given excellent results.

The catalyst composite prepared in the aforesaid manner may be formed into particles of definite size and shape by any suitable method. For example, a suitable pelleting agent, including hydrogenated vegetable oils, graphite, etc., may be commingled with the catalyst composite in a powdered form and the resulting mixture compressed in the shape of pills, pellets, or the like. In a preferred method the physical configuration, i.e., pills, pellets, granules, etc., of the calcium chloride or calcium oxide initially treated, is substantially as desired of the final catalyst composite. In other words, the calcium chloride or calcium oxide is preferably formed into the desired physical configuration prior to treatment thereof wtih hydrogen bromide.

The catalyst composite of this invention may be prepared to contain up to about 95% calcium bromide although the beneficial effect of the calcium bromide is evident at a concentration as low as about 5%.

One preferred embodiment of this invention relates to a dehydrobromination catalyst composite comprising calcium chloride and from about 25% to about 75% calcium bromide.

Another preferred embodiment concerns a dehydrobromination catalyst composite comprising calcium oxide and from about 25% to about 75% calcium bromide.

Although the catalyst composite of this invention has been described as comprising calcium chloride and calcium bromide, or calcium oxide and calcium bromide, it should be noted that the final catalyst composite, when prepared in the manner herein described, is characterized by a stability more in conformity with that exhibited by calcium chloride even though calcium bromide may comprise the larger portion of the composite. The method of the present invention thus enables the more active calcium bromide to be prepared in a stable physical configuration adaptable to the fixed-bed type of operation.

The following examples are presented to further illustrate the advantage of the catalyst herein proposed and the method whereby it may be prepared.

Example I 2-bromopropane was dehydrobrominated by passing the same through a catalyst bed at a temperature of from about 250° C. to about 350° C. The catalyst was initially 8 mesh calcium chloride granules. The calcium chloride, in contact with hydrogen bromide evolved during the course of the dehydrobromination reaction, was converted to a catalyst composite comprising calcium chloride and about 63 mole percent calcium bromide. Complete conversion of the 2-bromopropane to propylene was effected in the presence of the calcium chloride-calcium bromide catalyst composite. The catalyst composite was stable when exposed to the atmosphere and retained its granular configuration.

Example II 1,3-dibromobutane was dehydrobrominated by passing the same through a catalyst bed at an initial temperature of about 525° C. The catalyst was initially 8 mesh calcium chloride granules. The calcium chloride, in contact with the hydrogen bromide evolved during the course of the reaction, was converted to a catalyst comprising calcium chloride and about 59 mole percent calcium bromide. Conversion of the 1,3-dibromobutane to butadiene was maintained constant at about 90% with the formation of the calcium chloride-calcium bromide composite, although the temperature was reduced to about 500° C. The catalyst composite was stable when exposed to the atmosphere and retained its granular configuration.

Example III

In a somewhat more sever test, 1,4-dibromobutane was dehydrobrominated by passing the same through a catalyst bed at a temperature of about 400° C. The catalyst was initially 8 mesh calcium chloride granules. The calcium chloride, in contact with hydrogen bromide evolved during the course of the dehydrobromination reaction, was converted to a catalyst composite comprising calcium chloride and about 28 mole percent calcium bromide. Conversion of the 1,4-dibromobutane to butadiene was about 25% initially, increasing to about 33% with the formation of the calcium chloride-calcium bromide composite. The catalyst composite was stable when exposed to the atmosphere and retained its granular configuration.

*Example IV*

2-bromopropane is dehydrobrominated in passing the same through a catalyst bed initially comprising granular calcium oxide at a temperature of from about 250° C. to about 350° C. The calcium oxide, in contact with hydrogen bromide evolved during the course of the dehydrobromination reaction, is converted to a stable catalyst comprising calcium oxide and calcium bromide. Conversion of the bromopropane to propylene increases to about 100% with formation of the calcium oxide-calcium bromide catalyst composite.

I claim as my invention:

1. A method of preparing a catalyst composite which comprises heating shaped particles of a compound of calcium selected from the group consisting of calcium chloride and calcium oxide in contact with hydrogen bromide for a sufficient time to convert from about 5% to about 95% of said compound to calcium bromide, thereby forming a calcium bromide-containing catalyst of stable physical configuration.

2. A method of preparing a catalyst composite which comprises heating shaped particles of a compound of calcium selected from the group consisting of calcium chloride and calcium oxide at a temperature of from about 50° C. to about 550° C. and in contact with hydrogen bromide for a sufficient time to convert from about 5% to about 95% of said compound to calcium bromide, thereby forming a calcium bromide-containing catalyst of stable physical configuration.

3. A method of preparing a catalyst composite which comprises heating shaped particles of calcium chloride at a temperature of from about 50° C. to about 550° C. in contact with hydrogen bromide for a sufficient time to convert from about 5% to about 95% of the calcium chloride to calcium bromide, thereby forming a calcium bromide-containing catalyst of stable physical configuration.

4. A method of preparing a catalyst composite which comprises heating shaped particles of calcium oxide at a temperature of from about 50° C. to about 550° C. in contact with hydrogen bromide for a sufficient time to convert from about 5% to about 95% of said oxide to calcium bromide, thereby forming a calcium bromide-containing catalyst of stable physical configuration.

5. A catalyst composite of shaped particles of a compound of calcium selected from the group consisting of calcium chloride and calcium oxide and from about 5% to about 95% calcium bromide, the amount of said calcium compound being sufficient to impart physical stability to the calcium bromide-containing particles.

6. A catalyst composite of shaped particles of calcium chloride and from about 5% to about 95% calcium bromide, the amount of said calcium chloride being sufficient to impart physical stability to the calcium bromide-containing particles.

7. A catalyst composite of shaped particles of calcium oxide and from about 5% to about 95% calcium bromide, the amount of said calcium oxide being sufficient to impart physical stability to the calcium bromide-containing particles.

References Cited by the Examiner

UNITED STATES PATENTS 2,803,679   8/1957   Conrad _____ 260—654

OTHER REFERENCES

Burr: "Textbook of Inorganic Chemistry," volume III. Part I, published by Charles Griffin and Co., Ltd., London, page 35.

Mellor: "Comprehensive Treatise on Inorganic and Theoretical Chemistry," volume 3, published by Longmans, Green and Company, London, 1923, page 725.

MAURICE A. BRINDISI, *Primary Examiner.*